(12) United States Patent
Andon et al.

(10) Patent No.: US 11,990,042 B2
(45) Date of Patent: *May 21, 2024

(54) INTELLIGENT ELECTRONIC FOOTWEAR AND CONTROL LOGIC FOR AUTOMATED INFRASTRUCTURE-BASED PEDESTRIAN TRACKING

(71) Applicant: NIKE, Inc., Beaverton, OR (US)

(72) Inventors: Christopher Andon, Portland, OR (US); Jordan M. Rice, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,568

(22) Filed: Jun. 16, 2023

(65) Prior Publication Data
US 2023/0343216 A1 Oct. 26, 2023

Related U.S. Application Data

(60) Continuation of application No. 17/949,961, filed on Sep. 21, 2022, now Pat. No. 11,727,808, which is a
(Continued)

(51) Int. Cl.
*G08G 1/16* (2006.01)
*A43B 3/34* (2022.01)
(Continued)

(52) U.S. Cl.
CPC ............... *G08G 1/162* (2013.01); *A43B 3/34* (2022.01); *A43B 3/36* (2022.01); *A43B 3/50* (2022.01);
(Continued)

(58) Field of Classification Search
CPC ....... A43B 3/0005; H04W 4/80; A43C 19/00; A63B 2024/0025; A63B 2220/13;
(Continued)

(56) References Cited

U.S. PATENT DOCUMENTS

| 7,924,152 | B1 * | 4/2011 | Daniel | G08B 25/016 340/539.13 |
| 8,231,506 | B2 * | 7/2012 | Molyneux | G01S 13/82 482/1 |

(Continued)

FOREIGN PATENT DOCUMENTS

| CN | 102576491 A | 7/2012 |
| CN | 105225474 A | 1/2016 |

(Continued)

*Primary Examiner* — An T Nguyen
(74) *Attorney, Agent, or Firm* — Quinn IP Law

(57) ABSTRACT

Presented are intelligent electronic footwear and apparel with controller-automated features, methods for making/operating such footwear and apparel, and control systems for executing automated features of such footwear and apparel. A method for automating a collaborative operation between an intelligent electronic shoe (IES) and an intelligent transportation management (ITM) system includes receiving, via a detection tag attached to the IES shoe structure, a prompt signal from a transmitter-detector module communicatively connected to a traffic system controller of the ITM system. In reaction to the received prompt signal, the detection tag transmits a response signal to the transmitter-detector module. The traffic system controller uses the response signal to determine a location of the IES's user, and the current operating state of a traffic signal proximate the user's location. The traffic system controller transmits a command signal to the traffic signal to switch from the current operating state to a new operating state.

20 Claims, 4 Drawing Sheets

Related U.S. Application Data continuation of application No. 17/358,211, filed on Jun. 25, 2021, now Pat. No. 11,464,275, which is a continuation of application No. 16/809,749, filed on Mar. 5, 2020, now Pat. No. 11,058,166, which is a continuation of application No. 16/414,353, filed on May 16, 2019, now Pat. No. 10,681,954, which is a division of application No. 16/114,648, filed on Aug. 28, 2018, now Pat. No. 10,334,906.

(60) Provisional application No. 62/678,796, filed on May 31, 2018.

(51) Int. Cl.
| | | |
|---|---|---|
| A43B 3/36 | (2022.01) | |
| A43B 3/50 | (2022.01) | |
| A43C 19/00 | (2006.01) | |
| B60Q 1/14 | (2006.01) | |
| B60Q 1/26 | (2006.01) | |
| B60Q 1/50 | (2006.01) | |
| B60Q 5/00 | (2006.01) | |
| B60Q 9/00 | (2006.01) | |
| G01S 5/00 | (2006.01) | |
| G01S 19/19 | (2010.01) | |
| G06F 1/16 | (2006.01) | |
| G08B 7/06 | (2006.01) | |
| G08B 21/02 | (2006.01) | |
| G08G 1/005 | (2006.01) | |
| H04W 4/02 | (2018.01) | |
| H04W 4/021 | (2018.01) | |
| H04W 4/80 | (2018.01) | |
| A43C 11/16 | (2006.01) | |
| G01S 19/49 | (2010.01) | |

(52) U.S. Cl.
CPC ............... *A43C 19/00* (2013.01); *B60Q 1/14* (2013.01); *B60Q 1/2673* (2013.01); *B60Q 1/525* (2013.01); *B60Q 5/006* (2013.01); *B60Q 9/008* (2013.01); *G01S 5/0027* (2013.01); *G01S 5/0072* (2013.01); *G01S 19/19* (2013.01); *G06F 1/163* (2013.01); *G08B 7/06* (2013.01); *G08B 21/02* (2013.01); *G08G 1/005* (2013.01); *G08G 1/166* (2013.01); *H04W 4/021* (2013.01); *H04W 4/023* (2013.01); *H04W 4/80* (2018.02); *A43C 11/165* (2013.01); *B60Q 2300/05* (2013.01); *G01S 19/49* (2013.01)

(58) Field of Classification Search
CPC ......... B60Q 5/006; B60Q 9/008; G06F 1/163; G08G 1/005; G08G 1/087
See application file for complete search history.

(56) References Cited

U.S. PATENT DOCUMENTS

| | | | | |
|---|---|---|---|---|
| 8,786,466 | B1* | 7/2014 | Aladas | G08C 17/02 340/944 |
| 10,109,188 | B2* | 10/2018 | Dauneria | G08G 1/087 |
| 10,172,409 | B1* | 1/2019 | Andon | G08G 1/087 |
| 10,192,433 | B1* | 1/2019 | Agarwal | G08G 1/09623 |
| 10,334,906 | B1* | 7/2019 | Andon | G08G 1/164 |
| 10,908,732 | B1* | 2/2021 | Sundara-Rajan | G06F 3/0446 |
| 2006/0217874 | A1* | 9/2006 | Ueda | G08G 1/095 701/117 |
| 2011/0140924 | A1* | 6/2011 | Sennett | G08G 1/07 340/944 |
| 2015/0237949 | A1 | 8/2015 | Poulos | |
| 2016/0163194 | A1* | 6/2016 | Dauneria | G08G 1/07 340/906 |
| 2016/0174899 | A1* | 6/2016 | Besnard | A43B 3/0005 600/595 |
| 2018/0165965 | A1* | 6/2018 | Ewert | H04W 84/12 |
| 2020/0090500 | A1* | 3/2020 | Aladas | G08G 1/005 |

FOREIGN PATENT DOCUMENTS

| | | |
|---|---|---|
| JP | H11250377 A | 9/1999 |
| JP | 2000004901 A | 1/2000 |
| JP | 2014186040 A | 10/2014 |
| JP | 2016530058 A | 9/2016 |
| JP | 2017188052 A | 10/2017 |
| JP | 2018030714 A | 3/2018 |
| JP | 2018087742 A | 6/2018 |
| KR | 20170040458 A | 4/2017 |

\* cited by examiner

INTELLIGENT ELECTRONIC FOOTWEAR AND CONTROL LOGIC FOR AUTOMATED INFRASTRUCTURE-BASED PEDESTRIAN TRACKING

CLAIM OF PRIORITY AND CROSS-REFERENCE TO RELATED APPLICATIONS

This application is a continuation of U.S. patent application Ser. No. 17/949,961, which was filed on Sep. 21, 2022, is now allowed, and is a continuation of U.S. patent application Ser. No. 17/358,211, which was filed on Jun. 25, 2021, is now U.S. Pat. No. 11,464,275 B2, and is a continuation of U.S. patent application Ser. No. 16/809,749, which was filed on Mar. 5, 2020, is now U.S. Pat. No. 11,058,166 B2, and is a continuation of U.S. patent application Ser. No. 16/414,353, which was filed on May 16, 2019, is now U.S. Pat. No. 10,681,954 B2, and is a divisional of U.S. patent application Ser. No. 16/114,648, which was filed on Aug. 28, 2018, is now U.S. Pat. No. 10,334,906 B1, and claims the benefit of priority to U.S. Provisional Patent App. No. 62/678,796, which was filed on May 31, 2018. All of the foregoing patent documents are incorporated herein by reference in their respective entireties and for all purposes.

TECHNICAL FIELD

The present disclosure relates generally to wearable electronic devices. More specifically, aspects of this disclosure relate to systems, methods, and devices for enabling automated features of intelligent electronic footwear and apparel.

BACKGROUND

Articles of footwear, such as shoes, boots, slippers, sandals, and the like, are generally composed of two primary elements: an upper for securing the footwear to a user's foot; and a sole structure for providing subjacent support for the foot. Uppers may be fabricated from a variety of materials—including textiles, foams, polymers, natural and synthetic leathers, etc. —that are stitched or adhesively bonded together to form a shell or harness for securely receiving a foot. For sandals and slippers, the upper may have an open toe or heel construction or may be generally limited to a series of straps extending over the instep and, in some designs, around the ankle. Conversely, boot and shoe designs incorporate a full upper with a closed toe or heel construction and an ankle opening through a rear quarter portion that provides access to the footwear's interior, facilitating entry and removal of the foot into and from the upper. A shoelace or strap may be utilized to secure the foot within the upper.

The sole structure is generally attached to a lower portion of the upper, positioned between the user's foot and the ground. In many articles of footwear, including athletic shoes, the sole structure is a layered construction that generally incorporates a comfort-enhancing insole, an impact-mitigating midsole, and a surface-contacting outsole. The insole, which may be located partially or entirely within the upper, is a thin and compressible member that provides a contact surface for the underside of the user's foot. By comparison, the midsole is mounted underneath the insole, forming a middle layer of the sole structure. In addition to attenuating ground reaction forces, the midsole may help to control foot motion and impart stability. Secured to the underside of the midsole is an outsole that forms the ground-contacting portion of the footwear and is usually fashioned from a durable and wear-resistant material that includes features for improving traction.

SUMMARY

Presented herein are intelligent electronic footwear with attendant control logic for enabling automated footwear capabilities, methods for making and methods for using such footwear, and control systems for provisioning automated features of intelligent electronic footwear. By way of example, there is presented an Internet of Adaptive Apparel and Footwear (IoAAF) system that wirelessly communicates with an intelligent electronic shoe (IES) to provision communication between the IES and a motor vehicle, i.e., footwear-to-vehicle (F2V) communications, or the IES and an intelligent transportation system, i.e., footwear-to-infrastructure (F2I) communications. In a representative implementation, an IES is equipped with a detection tag, such as a radio frequency (RF) transponder, that receives an incoming prompt signal. Prompt signals may be broadcast by a transmitter-detector module mounted to a stationary structure, such as a building, lamp post or traffic signal pole, or to a moving structure, such as a Society of Automotive Engineers (SAE) Level 3, 4 or 5 autonomous vehicle.

An IES detection tag may reply to the incoming prompt signal, which may have an RF power with a first frequency, by retransmitting the incoming signal as a transparent output signal, which may have an RF power with a second frequency. The transponder may be outfit with a frequency filter that limits incoming signals to those with the first frequency, a frequency converter that converts the incoming signal into the transparent output signal, and an amplifier that intensifies the output signal based on the incoming signal. Using vehicle-mounted or structure-mounted RF transmitter-detector modules to sweep an upcoming or surrounding area for response signals output by an IES transponder facilitates pedestrian collision avoidance by providing advance warning prior to field of view recognition.

By placing a detection tag on an IES and automating communication between the IES detection tag and a complementary transmitter-detector mounted on a vehicle, street pole, nearby building, etc., the networked IoAAF system allows the connected parties to "see ahead" of an impending collision by eliminating the need for direct line-of-sight sensing and provides upcoming "awareness" before the IES is in close proximity to the vehicle. In effect, the IoAAF system architecture helps to eliminate false negatives caused by standard sensor hardware being unable to effectively monitor pedestrians concealed at blind corners or behind other visual obstructions. Collision avoidance can be further enhanced by automating an audible, visible, and/or tactile warning to the pedestrian via the IES or by altering pedestrian flow through modulation of crosswalk signal timing. In addition to enabling pedestrian safety recognition, disclosed IoAAF systems can be employed in a manufacturing facility, e.g., to prevent robot-borne injury to assembly line workers, in a storage facility, e.g., to avert collision between a worker and a forklift or automated guided vehicle (AGV), or at a road construction site, e.g., to protect construction workers from passing vehicles.

For F2V and F2I applications, the IoAAF system can automate communication with the smart footwear/apparel, e.g., to conduct a pedestrian collision threat assessment based on a myriad of available data. For instance, the F2I system may conduct a pedestrian collision threat assessment prior to line-of-sight between the moving object and an IES user by aggregating, fusing, and analyzing: IES-generated user dynamics data (e.g., location, velocity, trajectory, accel./decel., etc.); user behavioral data (e.g., historical behavior at particular corner of intersection, historical behavior at intersections generally, historical behavior in current surrounding conditions, etc.); environmental data (e.g., intersection with red light vs. green light, residential vs. urban setting, inclement weather conditions vs. optimal driving conditions); crowd-sourced data (dynamics and behavior of other pedestrians near the IES user whom are also wearing intelligent footwear/apparel). Interoperable component communication is typically wireless and bi-directional, with data being delivered to and from infrastructure components over an ad hoc network e.g., using dedicated short-range communication (DSRC). Traffic management supervision systems can use IES, infrastructure, and vehicle data to set variable speed limits and adjust traffic signal phase and timing.

To enable wireless communications between an IES and a remote computing node, the IES may piggyback a communication session established by the user's smartphone, handheld computing device, or other portable electronic device with wireless communications capabilities. Alternatively, the IES may operate as a standalone device with a resident wireless communications device that is packaged within the shoe structure. Other peripheral hardware may include a resident controller, shortwave antenna, rechargeable battery, resident memory, SIM card, etc., all of which are housed inside the shoe structure. An IES may be equipped with a human-machine interface (HMI) that allows the user to interact with the footwear and/or the IoAAF system. For instance, one or more electroactive polymer (EAP) sensors may be woven into or formed as patches mounted on the shoe structure and operable to receive user inputs that allow the user to control operational aspects of the IES. Likewise, any of the attendant operations for executing an automated footwear feature may be executed locally via the IES controller or may be offboarded in a distributing computing fashion for execution by the smartphone, handheld computing device, IoAAF system, or any combination thereof.

As yet a further option, execution of any one or more desired footwear features may initially require security authentication of a user via the IES controller and/or an IoAAF system server computer. For instance, a distributed array of sensors within the shoe structure communicates with the IES controller to perform biometric validation, such as confirming a user's weight (e.g., via pressure sensors), shoe size (e.g., via Electro Adaptive Reactive Lacing (EARL)), toe print (e.g., via an optical fingerprint sensor), gait profile, or other suitable method. As an extension of this concept, any of the foregoing sensing devices may be employed as a binary (ON/OFF) switch to confirm the IES is actually on a user's foot when attempting to execute an automated feature.

Provisioning wireless data exchanges to facilitate execution of an automated feature may require the IES be registered with the IoAAF system. For instance, a user may record an IES serial number with the IoAAF system, which will then issue a validation key to a personal account, e.g., a "digital locker" operating on the user's smartphone, tablet, PC, or laptop, to provide additional authentication. Registration may be completed manually, e.g., via the user, or digitally, e.g., via a barcode or near-field communication (NFC) tag on the shoe. A unique virtual shoe may be assigned to an IES and stored in the digital locker; each virtual shoe may be backed by a blockchain security technology designed to help guarantee uniqueness and authenticity, such as a cryptographic hash function, a trusted timestamp, correlating transaction data, etc. While described with reference to an article of footwear as a representative application for the novel concepts presented herein, it is envisioned that many of the disclosed options and features may be applied to other wearable apparel, including clothing, headgear, eyewear, wrist wear, neck wear, leg wear, and the like. It is also envisioned that the disclosed features be implemented as part of an augmented reality (AR) device or system that is operable to superimpose data, notifications, and other visual indicators to carry out any of the techniques and options presented above and below.

Aspects of this disclosure are directed to methods for manufacturing and methods for operating any of the disclosed systems and devices. In an example, a method is presented for automating collaborative operations between an intelligent transportation management (ITM) system and one or more intelligent electronic shoes. Each IES is fabricated with an upper for attaching to a user's foot, and a sole structure attached to the underside of the upper for supporting the user's foot. This representative method includes, in any order and in any combination with any of the above or below disclosed features and options: transmitting, via a transmitter-detector module that is communicatively connected to a traffic system controller of the ITM system, a prompt signal to a detection tag attached to the IES's sole structure and/or upper; receiving, via the transmitter-detector module, a response signal generated by the detection tag responsive to receiving the prompt signal; determining, via the traffic system controller based on the response signal, the user's current location; identifying a traffic signal that is proximate the user's location and communicatively connected to the traffic system controller; determining the traffic signal's current (first) operating state; and transmitting a command signal by the traffic system controller to the traffic signal to switch from the current (first) operating state to a different (second) operating state.

Additional aspects of the present disclosure are directed to networked control systems and attendant logic for executing automated features of electronic footwear and apparel. For instance, a system is presented for automating collaborative operations between an intelligent transportation management system and an intelligent electronic shoe. The system includes a transmitter-detector module that mounts to a stationary traffic signal pole or similar structure and broadcasts a prompt signal. The system also includes a detection tag that mounts to the sole structure and/or upper of the IES and is operable to receive the transmitter-detector module's prompt signal and reactively transmit a response signal back to the transmitter-detector module. A traffic system controller is communicatively connected to the transmitter-detector module and operable to execute memory-stored instructions to perform various operations. The system controller is programmed to: determine a real-time location of the user based on the response signal output by the IES detection tag; determine a current (first) operating state (e.g., green signal phase) of a traffic signal proximate the user's location and communicatively connected to the traffic system controller; and, transmit a phase-change command signal to the traffic signal to switch from the current (first) operating state to a distinct (second) operating state (e.g., red signal phase).

For any of the disclosed systems, methods, and devices, the IES may be equipped with a footwear controller and one or more dynamics sensors, all of which are mounted to the sole structure and/or upper. The dynamics sensor(s) generates and outputs sensor data that is indicative of a speed and/or heading of the IES. The sensor data is transmitted via the IES footwear controller to the traffic system controller, the latter of which uses the received data to determine whether or not to transmit the command signal to the traffic signal for changing the signal's operating state. For instance, the traffic system controller may use the dynamics sensor data to determine an expected incursion time that the IES will likely breach a traffic lane that is regulated by the traffic signal. The traffic system controller will then determine an estimated phase change time as the difference between a current time and a preprogrammed phase change time at which the traffic signal is scheduled to switch from the first operating state to the second operating state. Once calculated, the traffic system controller will determine if the expected incursion time is less than the estimated phase change time; if so, the traffic system controller automatically transmits the phase-change command signal to the traffic signal. The traffic system controller may also determine: (1) if the speed of the IES is substantially equal to zero, and (2) if the heading of the IES is in a direction away from the traffic lane regulated by the traffic signal. If either (1) or (2) returns a positive determination, the traffic system controller is programmed to not transmit the phase-change command signal to the traffic signal.

For any of the disclosed systems, methods, and devices, the traffic system controller may ascertain a current location, speed, and/or trajectory of a motor vehicle in the traffic lane regulated by the traffic signal. The traffic system controller will contemporaneously determine whether or not the user's current location is within a predetermined proximity to the vehicle's current location. In this instance, the phase-change command signal is transmitted to the traffic signal in response to a determination that the user's location is within proximity to the vehicle's location. As yet a further option, the traffic system controller may transmit a pedestrian collision warning signal to the footwear controller responsive to the user's current location being within the predetermined proximity to the vehicle's current location. The footwear controller may respond to receipt of this pedestrian collision warning signal by transmitting one or more command signals to a resident alert system, which is attached to the sole structure/upper and operable to generate a predetermined visible, audible, and/or tactile alert that is perceptible by the user.

For any of the disclosed systems, methods, and devices, the detection tag may include an RF transponder that is mounted to the IES sole structure/upper. In this instance, the prompt signal has a first RF power with a first frequency, and the response signal has a second RF power with a second frequency that is distinct from the first frequency. The prompt signal may include an embedded data set; the response signal retransmits at least a portion of the embedded data set back to the transmitter-detector module. The RF transponder may be equipped with an RF antenna and a frequency filter connected to the RF antenna. The frequency filter is operable to reject any RF signals having an RF power with a frequency that is distinct from the first frequency.

For any of the disclosed systems, methods, and devices, the resident footwear controller may transmit real-time user position and dynamics data to the traffic system controller. The traffic system controller, in turn, fuses the real-time user position data and user dynamics data to determine a pedestrian collision threat value. This pedestrian collision threat value is predictive of intrusion of the user with respect to the motor vehicle's current location and predicted route. The footwear controller may also aggregate and transmit behavioral data that is indicative of the user's historical behavior when wearing the IES. In this instance, the pedestrian collision threat value is further based on fusion of the user position and dynamics data with the behavioral data. As another option, the traffic system controller may collect crowd-sourced data that is indicative of the behavior of multiple individuals in proximity to the user. In this instance, the pedestrian collision threat value is also based on fusion of the behavioral data, user position data, and user dynamics data with the crowd-sourced data. The traffic system controller may also aggregate and transmit environmental data that is indicative of characteristics of the user's surrounding environment. The pedestrian collision threat value may be further based on fusion of the behavioral data, user position data, user dynamics data, and crowd-sourced data with the environmental data.

For any of the disclosed systems, methods, and devices, the traffic system controller may transmit a pedestrian collision warning signal to the footwear controller; the footwear controller may automatically respond by transmitting an activation command signal to a resident haptic transducer thereby causing the haptic transducer to generate a predetermined tactile alert designed to warn the user of an impending collision with a motor vehicle. Optionally or alternatively, the footwear controller may automatically respond to receiving the pedestrian collision warning signal by outputting an activation command signal to a resident audio system causing an associated audio component to generate a predetermined audible alert that is designed to warn the user of the impending collision. As yet a further option, the resident footwear controller may automatically respond to receiving the pedestrian collision warning signal by transmitting an activation command signal to a resident light system causing an associated lighting element to generate a predetermined visible alert that is designed to warn the user of the impending collision with a motor vehicle.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
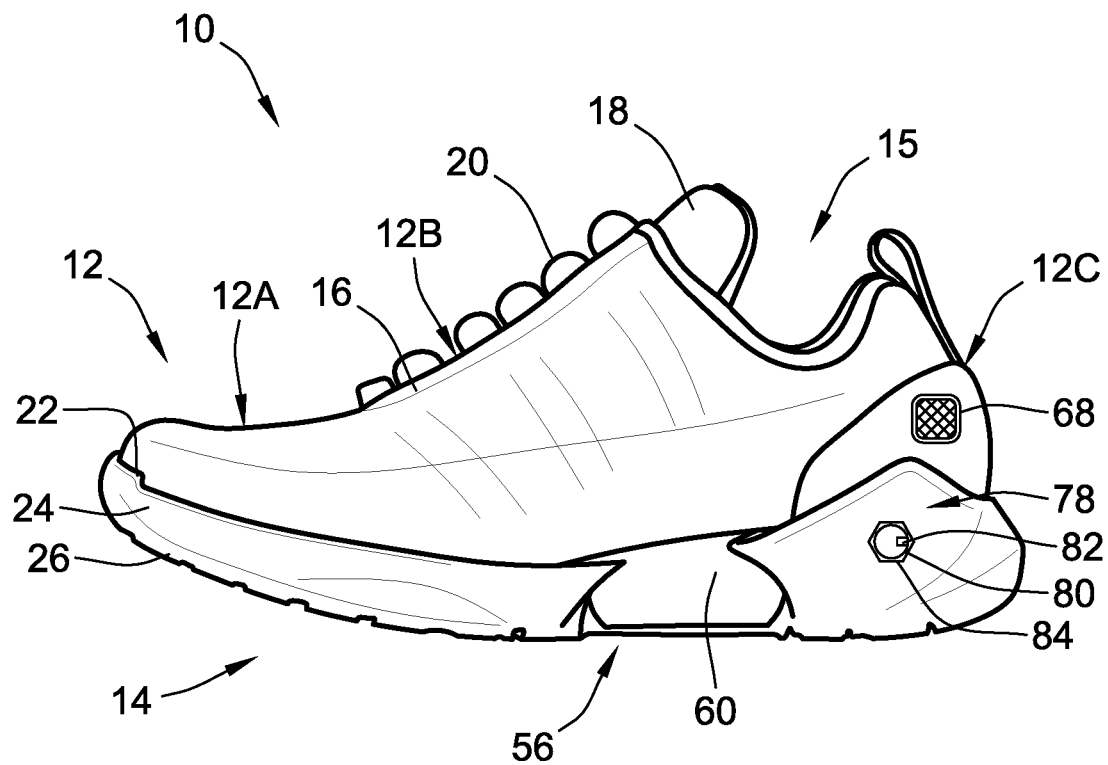
FIG. 1 is a lateral, side-view illustration of a representative intelligent electronic shoe with controller-automated footwear features in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. There are shown in the drawings and will herein be described in detail representative embodiments of the disclosure with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference, or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," "generally," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging portion of the sole structure seated on a flat surface, for example.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated footwear 10—also referred to herein as "intelligent electronic shoe" or "IES" for brevity—is merely an exemplary application with which novel aspects and features of this disclosure may be practiced. In the same vein, implementation of the present concepts for a wearable electronic device that is worn on a human's foot should also be appreciated as a representative application of the concepts disclosed herein. It will therefore be understood that aspects and features of this disclosure may be integrated into other footwear designs and may be incorporated into any logically relevant type of wearable electronic device worn on any part of the body. As used herein, the terms "shoe" and "footwear," including permutations thereof, may be used interchangeably and synonymously to reference any relevant type of garment worn on a foot. Lastly, features presented in the drawings are not necessarily to scale and are provided purely for instructional purposes. Thus, the specific and relative dimensions shown in the drawings are not to be construed as limiting.

Figure 2:
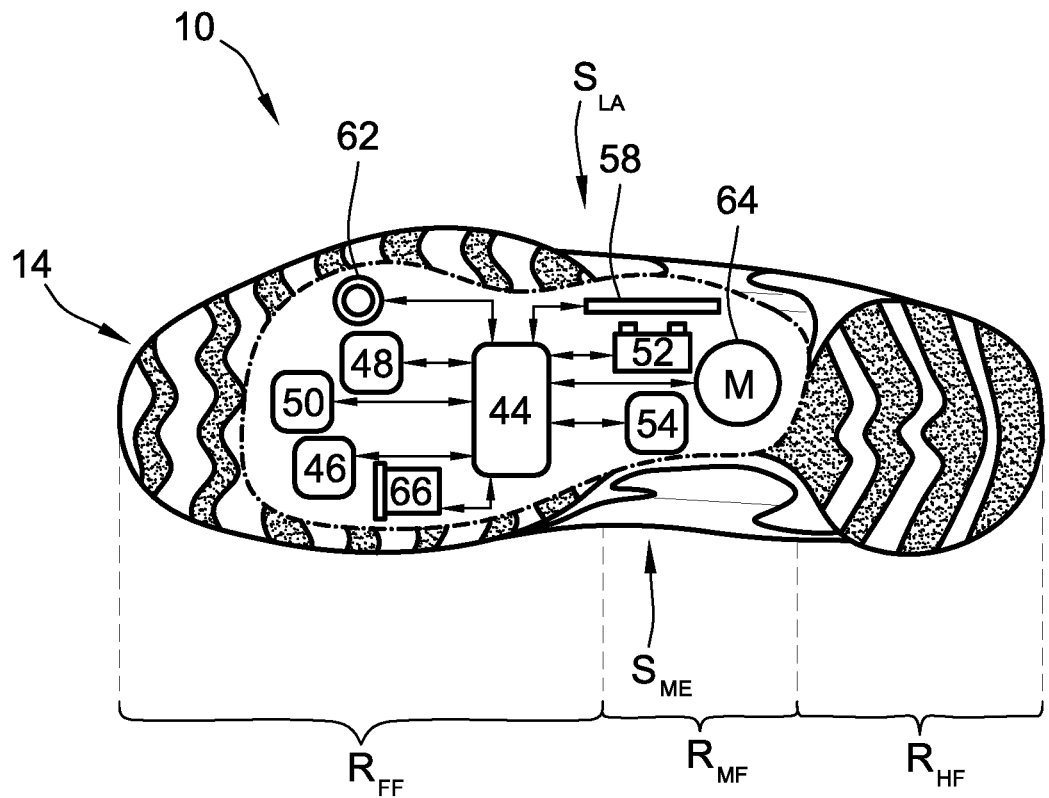
FIG. 2 is a partially schematic, bottom-view illustration of the representative intelligent electronic shoe of FIG. 1.
Figure 3:
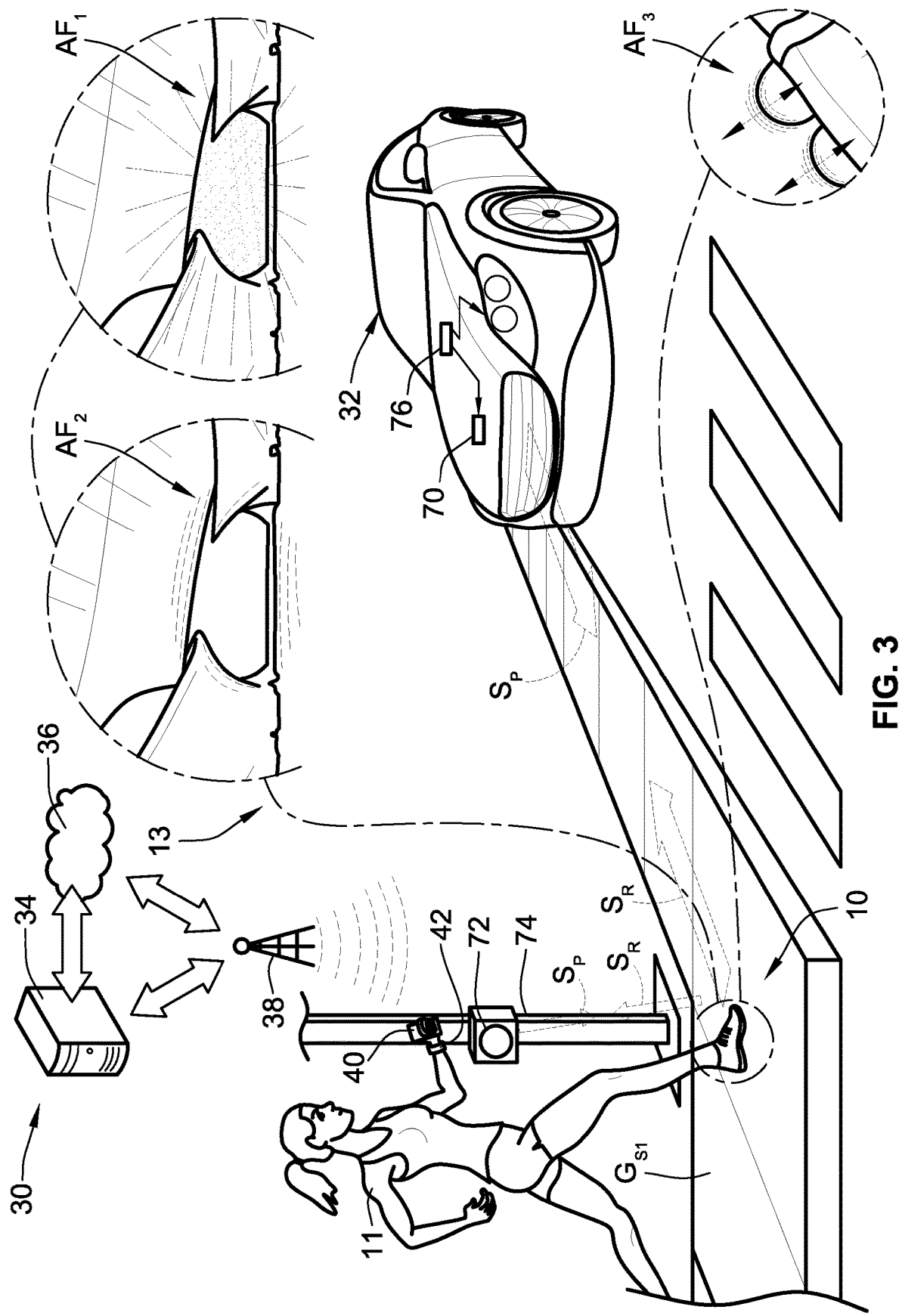
FIG. 3 is a partially schematic, perspective-view illustration of a representative user wearing a pair of the intelligent electronic shoes of FIGS. 1 and 2 during a wireless data exchange to execute one or more automated footwear features as part of an infrastructure-based pedestrian tracking protocol.

The representative article of footwear 10 is generally depicted in FIGS. 1 and 2 as a bipartite construction that is primarily composed of a foot-receiving upper 12 mounted on top of a subjacent sole structure 14. For ease of reference, footwear 10 may be divided into three anatomical regions: a forefoot region $R_{FF}$, a midfoot region $R_{MF}$, and a hindfoot (heel) region $R_{HF}$, as shown in FIG. 2. Footwear 10 may also be divided along a vertical plane into a lateral segment $S_{LA}$—a distal half of the shoe 10 farthest from the sagittal plane of the human body—and a medial segment $S_{ME}$—a proximal half of the shoe 10 closest to the sagittal plane of the human body. In accordance with recognized anatomical classification, the forefoot region $R_{FF}$ is located at the front of the footwear 10 and generally corresponds with the phalanges (toes), metatarsals, and any interconnecting joints thereof. Interposed between the forefoot and hindfoot regions $R_{FF}$ and $R_{HF}$ is the midfoot region $R_{MF}$, which generally corresponds with the cuneiform, navicular, and cuboid bones (i.e., the arch area of the foot). Heel region $R_{HF}$, in contrast, is located at the rear of the footwear 10 and generally corresponds with the talus and calcaneus bones. Both lateral and medial segments $S_{LA}$ and $S_{ME}$ of the footwear 10 extend through all three anatomical regions $R_{FF}$, $R_{MF}$, $R_{HF}$, and each corresponds to a respective transverse side of the footwear 10. While only a single shoe 10 for a left foot of a user is shown in FIGS. 1 and 2, a mirrored, substantially identical counterpart for a right foot of a user may be provided, as shown in FIG. 3. Recognizably, the shape, size, material composition, and method of manufacture of the shoe 10 may be varied, singly or collectively, to accommodate practically any conventional or nonconventional application.

With reference again to FIG. 1, the upper 12 is depicted as having a closed toe and heel configuration that is generally defined by three adjoining sections: a toe box 12A that covers and protects the toes; a vamp 12B that is located aft of the toe box 12A and extends around the lace eyelets 16 and tongue 18; and a rear quarter 12C that is positioned aft of the vamp 12B and includes the rear and sides of the upper 12 that covers the heel. The upper 12 portion of the footwear 10 may be fabricated from any one or combination of a variety of materials, such as textiles, foams, polymers, natural and synthetic leathers, etc., that are stitched, adhesively bonded, or welded together to form an interior void for comfortably receiving a foot. The individual material elements of the upper 12 may be selected and located with respect to the footwear 10 in order to impart desired properties of durability, air-permeability, wear-resistance, flexibility, and comfort, for example. An ankle opening 15 in the rear quarter 12C of the upper 12 provides access to the interior of the shoe 10. A shoelace 20, strap, buckle, or other mechanism may be utilized to modify the girth of the upper 12 to more securely retain the foot within the interior of the shoe 10 as well as to facilitate entry and removal of the foot from the upper 12. Shoelace 20 may be threaded through a series of eyelets in the upper 12; the tongue 18 may extend between the lace 20 and the interior void of the upper 12.

Sole structure 14 is rigidly secured to the upper 12 such that the sole structure 14 extends between the upper 12 and a support surface upon which a user stands (e.g., the sidewalk $G_{S1}$ illustrated in FIG. 3). In effect, the sole structure 14 functions as an intermediate support platform that separates the user's foot from the ground. In addition to attenuating ground reaction forces and providing cushioning for the foot, sole structure 14 of FIGS. 1 and 2 may provide traction, impart stability, and help to limit various foot motions, such as inadvertent foot inversion and eversion. In accordance with the illustrated example, the sole structure 14 is fabricated as a sandwich structure with a top-most insole 22, an intermediate midsole 24, and a bottom-most outsole 26. Insole 22 is shown located partially within the interior void of the footwear 10, firmly secured to a lower portion of the upper 12, such that the insole 22 is located adjacent a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethyl-vinyl acetate (EVA), filler materials, moderators, air-filled bladders, plates, lasting elements, or motion control members. Outsole 26, which may be absent in some configurations of footwear 10, is secured to a lower surface of the midsole 24. The outsole 26 may be formed from a rubber material that provides a durable and wear-resistant surface for engaging the ground. In addition, outsole 26 may also be textured to enhance the traction (i.e., friction) properties between footwear 10 and the underlying support surface.

FIG. 3 is a partially schematic illustration of an exemplary IES data network and communications system, designated generally as 30, for provisioning wireless data exchanges to execute one or more automated footwear features for a pair of intelligent electronic shoes 10 worn by a user or client 11. While illustrating a single user 11 communicating over the IES system 30 with a single motor vehicle 32, it is envisioned that any number of users may communicate with any number of motor vehicles or other remote computing nodes that are suitably equipped for wirelessly exchanging information and data. One or both IES 10 of FIG. 3 communicatively couples to a remote host system 34 or a cloud computing system 36 via a wireless communications network 38. Wireless data exchanges between the IES 10 and IES system 30 may be conducted directly—in configurations in which the IES 10 is equipped as a standalone device—or indirectly—by pairing and piggy backing the IES 10 onto a smartphone 40, smartwatch 42, wireless fidelity (WiFi) node, or other suitable device. In this regard, the IES 10 may communicate directly with the motor vehicle 32, e.g., via a short-range wireless communication device (e.g., a BLUETOOTH® unit or near field communication (NFC) transceiver), a dedicated short-range communications (DSRC) component, a radio antenna, etc. Only select components of the IES 10 and IES system 30 are shown and will be described in detail herein. Nevertheless, the systems and devices discussed herein can include numerous additional and alternative features, and other available hardware and well-known peripheral components, for example, for carrying out the various methods and functions disclosed herein.

With continuing reference to FIG. 3, the host system 34 may be implemented as a high-speed server computing device or a mainframe computer capable of handling bulk data processing, resource planning, and transaction processing. For instance, the host system 34 may operate as the host in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (Io-AAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). In at least some aspects, most if not all data transaction functions carried out by the IES 10 may be conducted over a wireless network, such as a wireless local area network (WLAN) or cellular data network, to ensure freedom of movement of the user 11 and IES 10.

Footwear 10 is equipped with an assortment of embedded electronic hardware to operate as a hands-free, rechargeable, and intelligent wearable electronic device. The various electronic components of the IES 10 are governed by one or more electronic controller devices, such as a resident footwear controller 44 (FIG. 2) that is packaged inside the sole structure 14 of footwear 10. The footwear controller 44 may comprise any one or various combinations of one or more of: a logic circuit, a dedicated control module, an electronic control unit, a processor, an application specific integrated circuit, or any suitable integrated circuit device, whether resident, remote or a combination of both. By way of example, the footwear controller 44 may include a plurality of microprocessors including a master processor, a slave processor, and a secondary or parallel processor. Controller 44, as used herein, may comprise any combination of hardware, software, and/or firmware disposed inside and/or outside of the shoe structure of the IES 10 that is configured to communicate with and/or control the transfer of data between the IES 10 and a bus, computer, processor, device, service, and/or network. The footwear controller 44 is generally operable to execute any or all of the various computer program products, software, applications, algorithms, methods and/or other processes disclosed herein. Routines may be executed in real-time, continuously, systematically, sporadically and/or at regular intervals, for example, each 100 microseconds, 3.125, 6.25, 12.5, 25 and 100 milliseconds, etc., during ongoing use or operation of the controller 44.

Footwear controller 44 may include or may communicate with a resident or remote memory device, such as a resident footwear memory 46 that is packaged inside the sole structure 14 of footwear 10. Resident footwear memory 46 may comprise semiconductor memory, including volatile memory (e.g., a random-access memory (RAM) or multiple RAM) and non-volatile memory (e.g., read only memory (ROM) or an EEPROM), magnetic-disk storage media, optical storage media, flash memory, etc. A resident power supply, such as a lithium ion battery 52 with plug-in or cable-free (induction or resonance) rechargeable capabilities, may be embedded within upper 12 or sole structure 14 of the footwear 10.

Long-range communication capabilities with remote networked devices may be provided via one or more or all of a cellular network chipset/component, a satellite service chipset/component, or a wireless modem or chipset/component, all of which are collectively represented at 48 in FIG. 2. Close-range wireless connectivity may be provided via a BLUETOOTH® transceiver, a radio-frequency identification (RFID) tag, an NFC device, a DSRC component, and/or a radio antenna, all of which are collectively represented at 50. Wireless communications may be further facilitated through implementation of a BLUETOOTH Low Energy (BLE), category (CAT) M1 or CAT-NB1 wireless interface. The various communications devices described above may be configured to exchange data between devices as part of a systematic or periodic beacon message that is broadcast in a footwear-to-vehicle (F2V) data exchange and/or a footwear-to-everything (F2X) data exchange, e.g., footwear-to-infrastructure (F2I), footwear-to-pedestrian (F2P), or footwear-to-footwear (F2F).

Location and movement of the IES 10 and, thus, the user 11 may be tracked via a location tracking device 54, which can reside inside the sole structure 14 or the upper 12 or a combination of both. Location can be determined through a satellite-based global positioning system (GPS) or other suitable navigation system. In an example, a GPS system may monitor the location of a person, a motor vehicle or other target object on earth using a collaborating group of orbiting GPS satellites the communicate with a suitable GPS transceiver to thereby generate, in real-time, a time-stamped series of data points. In addition to providing data relating to absolute latitudinal and longitudinal position coordinates of a GPS receiver borne by a target object, data provided via the GPS system may be adapted and used to provide information regarding elapsed time during execution of a designated operation, a total distance moved, an elevation or altitude at a specific location, an elevation change within a designated window of time, a movement direction, a movement speed, and the like. Aggregated sets of the foregoing GPS data may be used by the resident footwear controller 44 to estimate a predicted route of the user 11. GPS system data, singly and collectively, may be used to supplement and optionally to calibrate accelerometer-based or other pedometer-based speed and distance data. To this end, information collected by the GPS satellite system may be used to generate correction factors and/or calibration parameters for use by the IES 10 to help ensure accurate sensor data and, thus, optimal system operation.

Even without a GPS receiver, the IES 10 can determine location and movement information through cooperation with a cellular system through a process known as "trilateration." A cellular system's towers and base stations communicate radio signals and are arranged into a network of cells. Cellular devices, such as IES 10, may be equipped with low-power transmitters for communicating with the nearest tower, base station, router, or access point. As a user moves with the IES 10, e.g., from one cell to another, the base stations monitor the strength of the transmitter's signal. When the IES 10 moves toward the edge of one cell, the transmitter signal strength diminishes for a current tower. At the same time, the base station in the approaching cell detects a strength increase in the signal. As the user moves into a new cell, the towers transfer the signal from one to the next. Resident footwear controller 44 can determine the location of the IES 10 based on measurements of the transmitter signals, such as the angle of approach to the cell tower(s), the respective time it takes for individual signals to travel to multiple towers, and the respective strength of each signal when it reaches a corresponding tower. According to other aspects of the present concepts, one or more movement sensing devices may be integrated into the shoe structure to determine dynamic movement (e.g., translation, rotation, velocity, acceleration, etc.) of the IES 10 with respect to an established datum or reference (e.g., position, spatial orientation, reaction, force, velocity, acceleration, electrical contact, etc.) about or along one or more axes.

With collective reference to FIGS. 1 and 2, the article of footwear 10 may be equipped with a resident lighting system 56 with one or more lighting devices governed by footwear controller 44 to selectively illuminate the shoe structure and surrounding areas thereof. Different types of lighting devices may be employed by the lighting system 56, including light emitting diodes (LEDs), electroluminescent panels (ELP), compact florescent lamps (CFL), high intensity discharge lamps, flexible and inflexible organic LED displays, flat-panel liquid-crystal displays (LCD), as well as other available types of lighting elements. Any number of lighting devices may be disposed on any portion of shoe 10; as shown, a first lighting device 58 is packaged inside the sole structure 14, located within the midfoot region $R_{MF}$ of the footwear 10. First lighting device 58 is positioned immediately adjacent a window 60 (FIG. 1) that seals off a frame aperture extending through a peripheral wall of the sole structure 14 on the lateral side of the shoe 10. This lighting device 58 may be operated in an illuminated or "ON" state, a non-illuminated or "OFF" state, a series of illumination intensities (e.g., low, medium and high light outputs), an assortment of colors, and/or an assortment of illumination patterns. With this arrangement, the first lighting device 58 selectively illuminates a portion of the upper 12, a portion of the sole 14, and a portion of the ground surface Gs/adjacent the IES 10.

Figure 5:
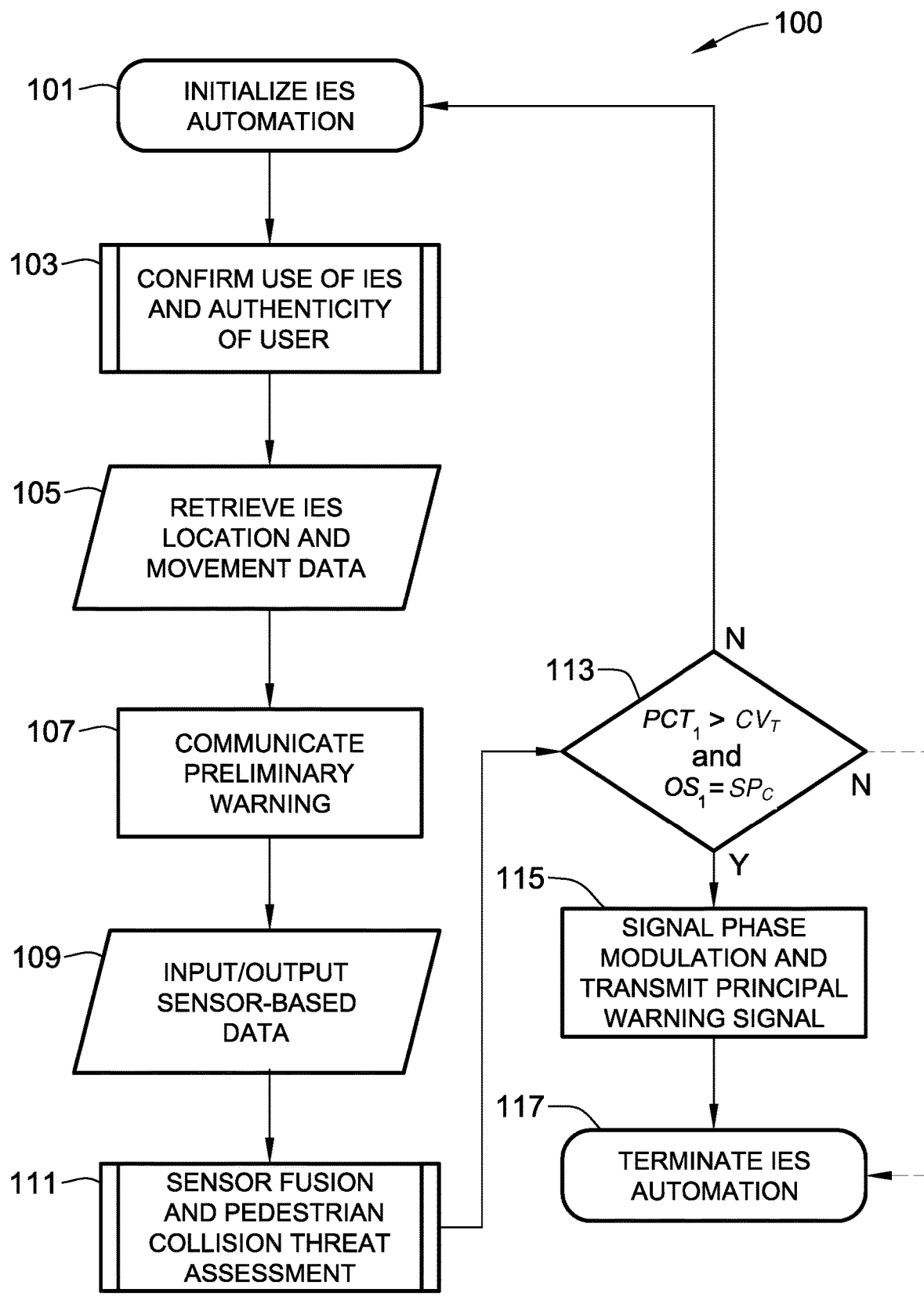
FIG. 5 is a flowchart for an automated footwear feature protocol that may correspond to memory-stored instructions executed by resident or remote control-logic circuitry, programmable controller, or other computer-based device or network of devices in accord with aspects of the disclosed concepts.

With reference now to the flow chart of FIG. 5, an improved method or control strategy for automating a collaborative operation between a wearable electronic device, such as IES 10 of FIGS. 1 and 2, and an intelligent transportation management (ITM) system, which may be represented herein by IES data network and communications system 30 of FIG. 3, is generally described at 100 in accordance with aspects of the present disclosure. Some or all of the operations illustrated in FIG. 5 and described in further detail below may be representative of an algorithm that corresponds to processor-executable instructions that may be stored, for example, in main or auxiliary or remote memory, and executed, for example, by a resident or remote controller, central processing unit (CPU), control logic circuit, or other module or device, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 100 begins at terminal block 101 with processor-executable instructions for a programmable controller or control module or similarly suitable processor, such as resident footwear controller 44 of FIG. 2, to call up an initialization procedure for a protocol to govern operation of a wearable electronic device, such as IES 10 of FIG. 1. This routine may be called-up and executed in real-time, continuously, systematically, sporadically, and/or at regular intervals, etc., during use of the intelligent electronic shoe 10. With reference to the IES data network and communications system 30 architecture of FIG. 3, as a representative implementation of the methodology set forth in FIG. 5, the initialization procedure at block 101 may be automatically commenced each time the user 11 approaches a roadway or roadway intersection 13. Terminal block 101 may also be commenced each time the user 11 approaches or is approached by a vehicle 32, each time the user 11 is within detectable proximity to a moving transmitter-detector module 70 (e.g., mounted to the vehicle 32), and/or is within detectable proximity to a stationary transmitter-detector module 72 (e.g., mounted to a crosswalk signal post 74).

Utilizing a portable electronic device, such as smartphone 40 or smartwatch 42, the user 11 may launch a dedicated mobile application or a web-based applet that collaborates with a traffic system controller (e.g., represented by remote host system 34) through an IoAAF middleware node (e.g., represented by cloud computing system 36) to monitor the user 11, e.g., as part of a pedestrian collision avoidance procedure. The example illustrated in FIG. 3 portrays a singular pedestrian—a female runner—avoiding injury resulting from an accident with a singular automobile—an SAE Level 3, 4 or 5 autonomous vehicle—at the intersection of an urban roadway. However, it is envisioned that the IES system 30 monitor and protect any number and type of user from any number and type of vehicle or object operating in any logically relevant environment.

To enhance security, interaction between the IES 10 and IES system 30 can be enabled by an authentication process at predefined process block 103. Authentication may be performed by a primary or secondary source that confirms proper activation of a wearable electronic device and/or a valid identity of the device's user. Upon manual entry of user identification information, such as a password, PIN number, credit card number, personal information, biometric data, predefined key sequences, etc., the user may be permitted to access a personal account, e.g., a "digital locker" operating on the user's smartphone 40 with a NIKE+® Connect software application and registered with the IoAAF middleware node. Thus, data exchanges can be enabled by, for example, a combination of personal identification input (e.g., mother's maiden name, social security number, etc.) with a secret PIN number (e.g., six or eight-digit code), or a combination of a password (e.g., created by the user 11) and a corresponding PIN number (e.g., issued by the host system 34), or a combination of a credit card input with secret PIN number. Additionally, or alternatively, a barcode, RFID tag, or NFC tag may be imprinted on or attached to the IES 10 shoe structure and configured to communicate a security authentication code to the IES system 30. Other established authentication and security techniques, including blockchain cryptographic technology, can be utilized to prevent unauthorized access to a user's account, for example, to minimize an impact of unsanctioned access to a user's account, or to prevent unauthorized access to personal information or funds accessible via a user's account.

As an alternative or supplemental option to manually entering identification information at predefined process block 103, security authentication of the user 11 may be automated by the resident footwear controller 44. By way of non-limiting example, a pressure sensor 62, which may be in the nature of a binary contact-type sensor switch, may be attached to the footwear 10 (e.g., embedded within the midsole 24 of the sole structure 14). This pressure sensor 62 detects a calibrated minimum load on the insole 22 and thereby establishes the presence of a foot in the upper 12.

Any future automated features of the IES 10 may first require the controller 44 confirm, via prompt signal to the binary pressure sensor 62, that a foot is present in the upper 12 and, thus, the footwear 10 is in use before transmitting a command signal to initiate an automated operation. While only a single sensor is illustrated in FIG. 2, it is envisioned that the IES 10 may be equipped with a distributed array of sensors, including pressure, temperature, moisture, and/or shoe dynamics sensors, packaged at discrete locations throughout the shoe structure. In the same vein, foot presence sensing (FPS) may be determined via a variety of available sensing technologies, including capacitance, magnetic, etc. Additional information regarding foot presence sensing can be found, for example, in U.S. Patent Application Publication Nos. 2017/0265584 A1 and 2017/0265594 A1, to Steven H. Walker, et al., both of which are incorporated herein by reference in their respective entireties and for all purposes.

In addition to functioning as a binary (ON/OFF) switch, the pressure sensor 62 may take on a multi-modal sensor configuration, such as a polyurethane dielectric capacitive biofeedback sensor, that detects any of assorted biometric parameters, such as the magnitude of an applied pressure generated by a foot in the upper 12, and outputs one or more signals indicative thereof. These sensor signals may be passed from the pressure sensor 62 to the resident footwear controller 44, which then aggregates, filters and processes the received data to calculate a weight value for a current user. The calculated current user weight for the individual presently using the IES 10 is compared to a previously validated, memory-stored user weight (e.g., authenticated to a registered user of an existing personal account). In so doing, the footwear controller 44 can determine if the current user weight is equal to or within a predetermined threshold range of the validated user weight. Once the current user is authenticated to the validated user, the resident footwear controller 44 is enabled to transmit command signals to one or more subsystems within the footwear 10 to automate a feature thereof.

Automated security authentication of a user may be achieved through other available techniques, as part of predefined process block 103, including cross-referencing characteristics of a current user's foot with previously validated characteristics of an authenticated user's foot. For instance, the representative IES 10 of FIG. 2 is assembled with a motorized lacing system utilizing a lace motor (M) 64 that is mounted to the footwear 10 and is selectively actuable to transition the shoelace 20 back-and-forth between an untensioned (loosened) state and one or more tensioned (tightened) states. Lace motor 64 may be in the nature of a two-way DC electric worm-gear motor that is housed inside the sole structure 14 and controlled by the resident footwear controller 44. Activation of the lace motor 64 may be initiated via a manually activated switch built into the shoe structure or softkey activation through an app on the user's smartphone 40 or smartwatch 42. Control commands may include, but are certainly not limited to, incremental tighten, incremental loosen, open/fully loosen, store "preferred" tension, and recall/restore tension. Additional information pertaining to motorized shoelace tensioning systems can be found, for example, in U.S. Pat. No. 9,365,387 B2, which is incorporated herein by reference in its entirety and for all purposes.

Motor control of lace motor 64 may be automated via the resident footwear controller 44, for example, in response to a sensor signal from pressure sensor 62 indicating that a foot has been placed inside the upper 12. Shoelace tension may be actively modulated through governed operation of the lace motor 64 by the controller 44 during use of the IES 10, e.g., to better retain the foot in response to dynamic user movement. In at least some embodiments, an H-bridge mechanism is employed to measure motor current; measured current is provided as an input to footwear controller 44. Resident footwear memory 46 stores a lookup table with a list of calibrated currents each of which is known to correspond to a certain lace tension position. By checking a measured motor current against a calibrated current logged in the lookup table, the footwear controller 44 may ascertain the current tension position of the shoelace 20. The foregoing functions, as well as any other logically relevant option or feature disclosed herein, may be applied to alternative types of wearable apparel, including clothing, headgear, eyewear, wrist wear, neck wear, leg wear, undergarments, and the like. Moreover, the lace motor 64 may be adapted to automate the tensioning and loosening of straps, latches, cables and other commercially available mechanisms for fastening shoes.

Similar to the pressure sensor 62 discussed above, the lace motor 64 may double as a binary (ON/OFF) switch that effectively enables and disables automated features of the IES 10. That is, the resident footwear controller 44, prior to executing an automated feature, may communicate with the lace motor 64 to determine whether the shoelace 20 is in a tensioned or untensioned state. If the latter, all automated features may be disabled by the resident footwear controller 44 to prevent the inadvertent initiation of an automated feature while the IES 10 is not in use, for example. Conversely, upon determination that the lace 20 is in a tensioned state, the footwear controller 44 is permitted to transmit automation command signals.

During operation of the lace motor 64, the shoelace 20 may be placed in any one of multiple discrete, tensioned positions to accommodate feet with differing girths or users with different tension preferences. A lace sensor, which may be built into the motor 64 or packaged in the sole structure 14 or upper 12, may be employed to detect a current tensioned position of the lace 20 for a given user. Alternatively, real-time tracking of a position of an output shaft (e.g., a worm gear) of the two-way electric lace motor 64 or a position of a designated section of the lace 20 (e.g., a lace spool mated with the motor's worm gear) may be used to determine lace position. Upon tensioning of the lace 20, the resident footwear controller 44 communicates with the lace motor 64 and/or lace sensor to identify a current tensioned position of the lace 20 for a current user. This current tensioned position is compared to a previously validated, memory-stored lace tensioned position (e.g., authenticated to a registered user of an existing personal account). Through this comparison, the footwear controller 44 can determine if the current tensioned position is equal to or within a predetermined threshold range of the validated tensioned position. After authenticating the current user to the validated user, command signals may be transmitted via the resident footwear controller 44 to one or more subsystems within the footwear 10 to automate a feature thereof.

Upon completion of the authentication procedure set forth in predefined process block 103, the method 100 of FIG. 5 proceeds to input/output block 105 with processor-executable instructions to retrieve sufficient data to track the motion of one or more target objects moving in a designated environment monitored by the IES system 30. In accord with the illustrated example of FIG. 3, the IES 10, remote host system 34, and/or cloud computing system 36 may receive, either directly or through cooperative operation with the smartphone 40 or smartwatch 42, location data that is indicative of a current location and velocity (speed and direction) of the user 11 and a current location and velocity (speed and direction) of the motor vehicle 32. User movement can also, or alternatively, be tracked through a dedicated mobile app or a route planning app running on the user's smartphone 40. Location and movement of the IES 10 and, thus, the user 11 can also be determined, for example, through a satellite-based GPS navigation system transceiver built into the upper 12 or sole structure 14. In addition to tracking real-time user dynamics, a back-office intermediary server, such as cloud computing system 36 acting as a middleware node, tracks the real-time location and movement of the vehicle 32, e.g., either through an on-board transmission device or through an app on the driver's personal computing device.

Another technique for ascertaining a user's location and attendant dynamics employs a detection tag 78 that is borne by the user 11 and communicates with a transmitter-detector module 70, 72 that is mounted to a nearby structure or on a nearby moving object. In accord with the representative application presented in FIGS. 1 and 3, the detection tag 78 is embodied as a passive or active radio frequency (RF) transponder that is mounted to an exterior surface of the sole structure 14. The RF transponder 78 of FIG. 1 includes an omnidirectional (Type I) RF antenna coil 80 that is fabricated with an electrically conductive material and is shaped to receive and transmit signals in the form of electromagnetic radiation waves. An RF frequency filter 82, which may be in the nature of a lumped-element Butterworth filter, is electrically connected to the RF antenna 80 and designed for bandpass operability to allow the passing of only those signals that have an RF power with a calibrated (first) frequency or are within a calibrated (first) frequency range. As another option, the frequency filter 82 may provide band-stop functionality that attenuates and denies the passing of all signals that have an RF power with an undesired frequency or a frequency within any one or more undesired frequency bands, namely outside the calibrated (first) frequency range. An optional dielectric cover 84 is placed over the antenna 80, filter 82 and attendant detection tag electronics to protect the componentry and increase performance as an RF transponder. Signal exchanges may be routed through a system packet interface (SPI) interface and general-purpose input/outputs (GPIOs). Frequency and phase-tunable signal output may be provided through a phase lock loop (PLL) or direct digital synthesis (DDS) synthesizer, harmonic mixer, and PLL or DDS synthesizer-based local oscillator.

As the user 11 approaches the roadway intersection 13 of FIG. 3, the detection tag 78 (FIG. 1) receives a frequency swept prompt signal $S_P$ or "ping" emitted at regular intervals by a moving transmitter-detector module 70, which may be packaged proximate the front end of the vehicle 32, or a stationary transmitter-detector module 72, which may be hung on a crosswalk signal post 74, a building wall, or similarly suitable immobile structure. For applications in which the detection tag 78 is composed of a passive RF transponder, the transmitter-detector module 70, 72 may broadcast the prompt signal $S_P$ in a repeating or substantially continuous manner. Conversely, for active RF transponder implementations, the incoming prompt signal $S_P$ may be emitted in answer to a callback signal broadcast by the detection tag 78 in a repeating or substantially continuous manner. The prompt signal $S_P$ is an electromagnetic field wave that has a predetermined (first) RF power level with a standardized (first) downlink frequency. In addition, the prompt signal $S_P$ contains an embedded data set with encoded, unique information (e.g., transmitter ID, interrogation code, timestamp, etc.). Data can be superimposed over the swept carrier wave in a narrowband system to help reduce bandwidth overhead that some implementations may create. It is to be noted that a reverse situation is also possible, where the tag 78 broadcasts and the module 70 accepts and retransmits prompt signal $S_P$.

Upon receipt of this prompt signal $S_P$, the detection tag 78 responsively processes and retransmits the prompt signal $S_P$ back to the transmitter-detector module 70, 72 as an outgoing response signal $S_R$. The response signal $S_R$ is an electromagnetic field wave that has a distinguishable (second) RF power with a complementary (second) uplink frequency that is distinct from the first frequency. The detection tag 78 may be equipped with an RF frequency converter to modulate the incoming prompt signal $S_P$ (e.g., by frequency multiplication of the incoming signal), and an RF signal amplifier that intensifies the response signal $S_R$, based on the incoming prompt signal $S_P$, prior to transmission of the response signal $S_R$ to the transmitter-detector module 70, 72. To help ensure that the transmitter-detector module 70, 72 recognizes the detection tag 78, the response signal $S_R$ parrots at least a portion of the prompt signal's $S_P$ embedded data back to the transmitter-detector module 70, 72. In order to minimize onboard power usage, the detection tag 78 may operate in two modes: an idle mode and an active mode. When idling, the detection tag 78 is generally dormant and, thus, does not draw power from the resident power supply 52 or an off-board power source. By comparison, when active, the detection tag 78 temporarily extracts power from the resident power supply 52 or is powered by the incoming prompt signal $S_P$. As such, the detection tag 78 does not transmit a transparent output signal unless and until an incoming signal with RF power of a predetermined frequency is received.

The intelligent electronic shoe 10 of FIGS. 1-3 may employ alternative means for exchanging data with the IES system 30 and motor vehicle 32 as part of executing the pedestrian collision threat assessment. Rather than using an RF transponder, the detection tag 78 may be fabricated with one or more electroactive polymer (EAP) sensors, each of which has a discrete dielectric EAP element mounted to the sole structure 14 or upper 12. In accord with this example, the incoming prompt signal $S_P$ is an electrical field that generates a current with sufficient voltage to induce a physical state change (e.g., an arcing or expansion) of the implanted dielectric EAP element. Through normal use of the IES 10, the user 11 will unknowingly reverse the physical state change of the EAP sensor, e.g., by flattening or compressing the dielectric EAP element with their foot. In so doing, the EAP sensor will generate an electric current that causes a response signal $S_R$ to be output by the IES 10. It is also envisioned that the IES 10 may be enabled to communicate directly with the vehicle 32, e.g., through a device-to-device wireless ad hoc network (WANET), rather than redirecting all data through the IES system 30 or other preexisting wireless access point(s).

Figure 4:
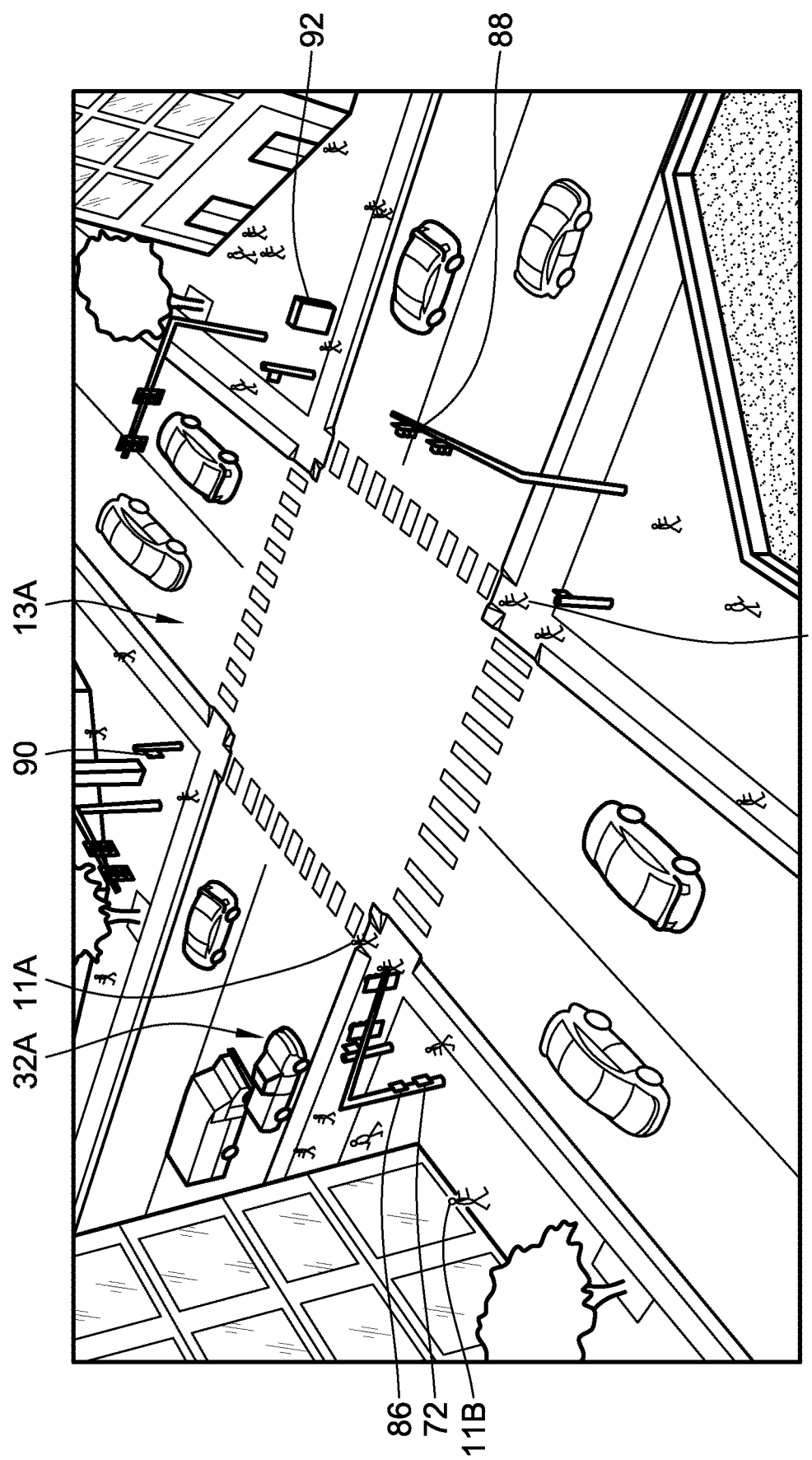
FIG. 4 is an elevated, perspective-view illustration of multiple representative users each wearing a pair of the intelligent electronic shoes of FIGS. 1 and 2 during a wireless data exchange with a representative intelligent transportation management system to execute one or more automated footwear features and one or more automated traffic system features.

With reference again to FIG. 5, the method 100 continues to process block 107 with processor-executable instructions for transmitting or receiving a preliminary pedestrian collision warning signal that is generated responsive to transmission of a response signal $S_R$ that indicates a user is approaching and may enter a roadway in a manner that may cause a motor vehicle accident. For rudimentary applications, a pedestrian collision warning signal may be automatically broadcast via the IES system 30 each time a user 11 is approaching an intersection 13 at the same time as a motor vehicle 32, irrespective of secondary variables. As seen, for example, in FIG. 4, a wireless transmitter node 86 of the IES system 30 may broadcast a preliminary warning signal to a first user 11A wearing IES 10 who is approaching and predicted to cross a roadway intersection 13A at the same time that a moving vehicle 32A is expected to traverse through the intersection 13A. Even though visually obstructed from each other by a building, a second user 11B wearing IES 10 and approaching the intersection 13A may also receive a preliminary warning signal to notify the user 11B in an overabundance of caution of the oncoming vehicle 32A. A pair of IES 10 may be registered to a visually, physically or mentally impaired user 11C; due to the increased likelihood that this individual may unknowingly wander into the intersection 13A as the vehicle 32A is passing through, a preliminary pedestrian collision warning signal may be sent to the third user 11C. Warning signals may be sent to multiple users 11A, 11B, 11C and any potentially threatening vehicle(s) 32A such that each party can take remediating action to prevent an inadvertent collision between a pedestrian and an automobile.

For more sophisticated multimodal applications, the IES system 30 receives data from an assortment of sensing devices that use, for example, photo detection, radar, laser, ultrasonic, optical, infrared, damped mass, smart material, or other suitable technology for object detection and tracking. In accord with the illustrated example, the IES system 30 may be equipped with or receive sensor signals from one or more digital cameras, one or more range sensors, one or more speed sensors, one or more dynamics sensors, and any requisite filtering, classification, fusion and analysis hardware and software for processing raw sensor data. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and some are capable of detecting different parameters within their operating range. Further, the performance of many sensor technologies may be affected by differing environmental conditions. Consequently, sensors generally present parametric variances whose operative overlap offer opportunities for sensory fusion.

A dedicated control module or suitably programmed processor will aggregate and pre-process a collection of sensor-based data, fuse the aggregated data, analyze the fused data in conjunction with related crowd-sourced data and behavioral data for each target object under evaluation, and estimate whether or not it is statistically probable that a target object will enter a predicted path of a motor vehicle. At input/output block 109, for example, the resident footwear controller 44 collects and transmits to the IES system 30: (1) position data with one or more parameters indicative of real-time position of the IES 10 and, thus, the user 11 (e.g., lat., lon., elevation, geospatial data, etc.), (2) dynamics data with one or more parameters indicative of real-time motion of the IES 10 and, thus, the user 11 (e.g., relative or absolute speed, acceleration/deceleration, trajectory, etc.) and (3) behavioral data indicative of historical behavior of the user 11 while wearing IES 10. Such historical data may include past tendencies of a given user when at a particular intersection or in a particular geographic location, past tendencies of a given user in urban or rural environments generally, past tendencies of a given user in various weather conditions, past tendencies of a given user in specific dynamic scenarios, etc. It is envisioned that the IES controller 44 may collect and transmit other types of data, including predictive path data indicative of an estimated path for the user 11 based on available current and historical information. Any such data may be collected and stored locally on the IES 10, via the IES system 30, via the vehicle 32, via neighboring devices and systems, or any combination of thereof.

At predefined process block 111, the method 100 of FIG. 5 proceeds with processor-executable instructions for a resident or remote controller to apply a sensor fusion module to aggregated raw sensor data to thereby determine movement of a target object in a monitored environment, such as a likelihood of intrusion of a pedestrian with respect to the location and predicted route of a vehicle. IES system 30, for example, conditions the data received from the resident footwear controller 44 in order to interrelate received sensor data to ensure overlap with a single, common "reference" timeframe, coordinate system, set of standard measurements, etc. Once the received sensor data is sufficiently conditioned to ensure alignment across related metrics, IES system 30 may execute a data association protocol that will classify each respective portion of sensor data, and then correlate related portions or sensor data based on any complementary classifications. IES system 30 may then execute a sensor fusion procedure of the conditioned and classified data along with path plan data of the target object and subject vehicle. Sensor fusion may be typified as a computational framework for the aggregation, analysis and alliance of data that originates from heterogeneous or homogeneous sources (e.g., the multiple distinct sensor types discussed above). For the illustrated application, sensor fusion may be embodied as a dedicated software appliance that intelligently combines data from several sensors and corrects for the deficiencies of the individual sensors to calculate more complete, accurate and intelligible information.

Upon completion of sensor fusion, the IES system 30 calculates a pedestrian collision threat value. This collision threat value is prognosticative of a monitored target object behaving in a manner that will more likely than not cause a detrimental event. In accord with the illustrated example, a pedestrian collision threat value may be predictive of intrusion of the user 11 in a manner that will at least partially obstruct a predicted route of the subject vehicle 32 as it relates to a current (real-time) location of the subject vehicle. This pedestrian collision threat value may be based on fusion of user position data, user dynamics data, and user behavioral data. Optionally, a pedestrian collision threat value may also incorporate fusion of the behavioral, user position, and user dynamics data with crowd-sourced data and environmental data. Environmental data may be composed of information that is indicative of a surrounding environment of the user, such as current weather conditions, current vehicle traffic conditions, current pedestrian traffic conditions, and the like. By comparison, crowd-sourced data may be composed of information that is indicative of location, movement and/or behavior of multiple individuals in proximity to the user. The remote computing node receiving the foregoing data may include the remote host system 34, the cloud computing system 36, the resident footwear controller 44, a resident vehicle controller 76 of the motor vehicle 32, or a distributed computing combination thereof. Alternatively, the footwear controller 44 may transmit any or all of the foregoing data through a wireless communications device 48, 50 to a central control unit of an intelligent transportation management system.

Method 100 of FIG. 5 proceeds to decision block 113 to determine if: (1) the pedestrian collision threat value $PCT_1$ generated at process block 111 is greater than a calibrated threshold value $CV_T$; and (2) a current (first) operating state $OS_1$ of a proximal traffic control signal is equal to any of one or more conflicting signal phases $SP_C$. As per the first inquiry, the calibrated threshold value $CV_T$ may be determined through empirical testing that provides sufficient quantitative data to establish a statistically significant minimum confidence percentage (e.g., 80%) below which a calculated collision threat value is either inconclusive or probabilistically concludes a collision event will not occur. Available techniques for identifying the calibrated threshold value $CV_T$ may include stochastic Gaussian processes, Finite Mixture Model (FMM) estimation protocols, or other normal or continuous probability distribution techniques.

For the latter of the two inquires conducted at decision block 113, the conflicting signal phases $SP_C$ includes any signal phase in which traffic is afforded right-of-way in a manner that does not allow for safe crossing at a given road segment. Traffic signal phasing may be implemented using signal indications, signal heads, and attendant control logic in a traffic system controller that governs and coordinates timing, sequence and duration. Signal phasing settings may be changed as needed, e.g., to accommodate changes in traffic demand, pattern, etc., and in a manner that yields safe and efficient operation for prevailing conditions. With reference again to FIG. 3, the user 11 is shown running at a speed and trajectory that is estimated to place them within the roadway of the intersection 13 at approximately the same time that the vehicle 32 is expected to pass through the same intersection 13. Upon detection of the user 11 via IES system 30 using a transmitter-detector module 70, 72, a backend server computer of remote host system 34 will identify a traffic signal or set of traffic signals (e.g., tricolored traffic control light 88 and pedestrian crosswalk signal 90 of FIG. 4) that is/are positioned at a road segment (e.g., intersection 13A) proximate the user's location and operable to regulate traffic flow (e.g., eastbound automobile travel and northbound pedestrian travel). Once identified, the remote host system 34 determines the traffic signal's real-time operating state, which may include a proceed state (continuous green light or WALK signal), a caution/yield state (continuous amber light or blinking WALK signal), a do not proceed or stop state (continuous red light or DON'T WALK signal), or transitionary states between any of the foregoing states (green to amber, amber to red, etc.). One or more of these operating states may be characterized as a conflicting signal phase $SP_C$. By way of non-limiting example, the proceed state, caution/yield state, and proceed-to-caution transitionary state may all be designated as a conflicting signal phase $SP_C$.

If either of the assessments conducted at decision block 113 comes back as negative (block 113=NO), the method 100 may circle back to terminal block 101 and run in a continuous loop or, alternatively, may proceed to terminal block 117 and temporarily terminate. Conversely, upon determining that the pedestrian collision threat value $PCT_1$ is in fact greater than the calibrated threshold value $CV_T$ and the current operating state $OS_1$ of the traffic control signal corresponds any one of the conflicting signal phases $SP_C$ (block 113=YES), the method 100 proceeds to process block 115 whereat one or more remediating actions are taken to avoid a collision between a user and a vehicle. By way of example, and not limitation, wireless transmitter node 86 may transmit a pedestrian collision imminent notification to the vehicle controller 76; vehicle controller 76 may immediately respond by issuing a braking command signal or signals to the vehicle brake system to execute a braking maneuver, e.g., to come to a full stop or to reduce speed to a calculated value that will readily allow an evasive steering maneuver. In addition, or alternatively, the vehicle 32 may perform other autonomous vehicle functions, such as controlling vehicle steering, governing operation of the vehicle's transmission, controlling engine throttle, and other automated driving functions. Visible and/or audible warnings may be transmitted to the driver using a vehicle center console infotainment system, a digital instrument cluster display or a personal portable electronic device.

Process block 115 may also include processor-executable instructions for automating pedestrian and vehicle traffic flow changes through traffic signal phase modulation. For instance, a traffic system controller (represented in FIG. 4 by a traffic signal control cabinet 92) transmits a command signal to a vehicle traffic control light 88 to switch from the first operating state (e.g., a green light) to a second operating state (e.g., an amber or red light) in an attempt to stop the motor vehicle 32 prior to entering the intersection 13 and thereby prevent a collision with the user 11. As indicated above, traffic signal phase modification may be based on user dynamics data (e.g., speed and heading) suggesting the user 11 will enter the monitored roadway segment 13 concomitant with vehicle dynamics data (e.g., velocity and predicted path) suggesting the vehicle 32 will enter the same monitored roadway segment 13. In this regard, the IES system 30 may receive and analyze IES dynamics sensor data to identify an expected incursion time that the IES 10 and, thus, the user 11 is estimated to breach the traffic lane regulated by the vehicle traffic control light 88.

IES system 30 may also determine an estimated phase change time, calculated as the difference between the current (real) time and a preprogrammed phase change time at which the traffic signal is scheduled to switch from its current operating state to an alternate operating state. Responsive to determination that the expected incursion time is less than the estimated phase change time—the user 11 is expected to enter the intersection 13 before the vehicle traffic control light 88 is preprogrammed to change from green to red, the traffic signal control cabinet 92 automatically transmits the phase-change command signal to the traffic control light 88. Alternatively, if the expected incursion time does not place the user 11 within the intersection 13 before a signal phase change, there is no need for the traffic signal control cabinet 92 to intercede and preemptively emit a phase-change command signal. The same can be said for instances in which user dynamics data indicates the user 11 has stopped or will stop before entering the intersection 13, or indicates the user 11 has taken on a complementary or alternate heading that will not place them in the intersection 13; once again, there is no need for the traffic signal control cabinet 92 to intercede and preemptively emit a phase-change command signal. Upon completion of the remediating actions executed at process block 115, the method 100 proceeds to terminal block 117 and temporarily terminates.

In addition to facilitating automation of one or more vehicle operations designed to mitigate or prevent a vehicle-pedestrian collision, method 100 may concomitantly facilitate automation of one or more IES features designed to mitigate or prevent a vehicle-pedestrian collision at process block 115. For instance, a first command signal may be transmitted to a first IES subsystem to execute a first automated feature $AF_1$ of an intelligent electronic shoe. According to the illustrated example of FIG. 3, resident footwear controller 44 receives the pedestrian collision threat value output at block 111, establishes that the threat value is greater than the threshold value at block 113, and responsively takes preventative action at block 115. Resident footwear controller 44 automatically responds to this determination (i.e., without any user or external system prompt) by transmitting a command signal to resident lighting system 56 to activate lighting device 58 to thereby generate a predetermined light output. The selected color and/or pattern is detectable by the user 11 and, optionally, the driver of vehicle 32, and is prominent enough to warn of the imminent collision. By way of non-limiting example, resident lighting system 56 may output a flashing, bright-red light pattern; use of this particular color and pattern may be restricted to warning the user of potential dangers. Light output of the IES 10 may be coordinated with light output of the forward-facing headlamps of the motor vehicle 32 to further facilitate notifying the user 11 of a predicted vehicle collision.

It is envisioned that any of the disclosed connected wearable electronic devices may automate additional or alternative features as part of the methodology 100 set forth in FIG. 5. Responding to a positive determination at decision block 113, footwear controller 44 may automatically transmit a second command signal to a second subsystem to execute a second automated feature $AF_2$ of the wearable electronic device. As a non-limiting example, the IES 10 of FIG. 2 is shown equipped with a haptic transducer 66 that is housed inside the sole structure 14 in operative communication to the insole 22. To alert the user 11 of the pedestrian collision threat assessment, the resident footwear controller 44 emits a command signal to the haptic transducer 66 to generate a haptic cue (e.g., a perceptible vibration force or a series of vibration pulses) that is transmitted from the midsole 24, through the insole 22, and to the user's foot. The intensity and/or pulse pattern output by the haptic transducer 66 as part of method 100 may be limited to instances of warning the user of a probable hazard.

An optional third automated feature $AF_3$ may include operating the lace motor 64 as a tactile force-feedback device that is selectively activated by the footwear controller 44 to rapidly tension and release the shoelace 20. Likewise, the IES 10 may operate in conjunction with the smartphone 40 (e.g., coordinated flashing of an LED camera light or an eccentric rotating mass (ERM) actuator) or an active apparel element (e.g., coordinated activation of a thermal or haptic device built into a shirt or shorts). As yet another option, haptic feedback can be utilized to provide turn-by-turn directions to the user (e.g., left foot or right foot vibrates at a heightened intensity and/or with a designated pulse pattern to indicate a left turn or right turn). In the same vein, haptic feedback can be employed in a similar fashion to direct a user along a pre-selected route or to warn a user against taking a particular route (e.g., deemed unsafe). Additional information regarding footwear and apparel with haptic feedback can be found, for example, in U.S. Patent Application Publication No. 2017/0154505 A1, to Ernest Kim, which is incorporated herein by reference in its entirety and for all purposes.

Optionally, the IES 10 may be provided with an audio system, which is represented in FIG. 1 by a miniaturized audio speaker 68 that is attached to the rear quarter 12C of the upper 12. Resident footwear controller 44, upon confirming that the pedestrian collision threat value is greater than the calibrated threshold value, automatically transmits a command signal to the audio system speaker 68 to generate a predetermined sound output. For instance, the audio system speaker 68 may blare "WARNING!" or "STOP!" at an increased sound level. As another option, footwear controller 44 may command the lace motor 64 to repeatedly tighten/loosen the shoelace 20 as a signal/cue, e.g., of an oncoming automobile. Footwear-to-infrastructure communications may be enabled (and coordinated) to allow the IES 10 to communicate with a networked "smart city" controller that, in turn, can modulate street lighting or traffic light changes to improve safety for a walker or runner. Conversely, the "smart city" controller may communicate with the IES 10 to warn the user they are coming up to a pedestrian crossing with a "Do Not Walk" sign signaling that pedestrians must yield the right of way to oncoming vehicles.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A wearable intelligent electronic apparel (IEA) system for communicating with an intelligent transportation management (ITM) system having a transmitter-detector module and an ITM system controller, the wearable IEA system comprising:
   an apparel body configured to be worn by a user;
   a detection tag operatively attached to the apparel body, the detection tag being operable to receive a prompt signal from the transmitter-detector module and responsively transmit a response signal to the transmitter-detector module; and
   a controller operatively attached to the apparel body and communicatively connected to the detection tag, the controller being programmed to:
      receive, from the ITM system controller, a user location of the user based on the response signal output by the detection tag to the transmitter-detector module;
      receive, from the ITM system controller, a first operating state of a traffic signal proximate the user location; and
      transmit, to the ITM system controller, a request to switch the traffic signal from the first operating state to a second operating state.

2. The wearable IEA system of claim 1, further comprising a dynamics sensor configured to detect a speed and/or a heading of the user and output sensor data indicative thereof, wherein the controller is further programmed to:
   determine, based on the sensor data received from the dynamics sensor, an expected incursion time that the user will breach a traffic lane regulated by the traffic signal;
   receive, from the ITM system controller, an estimated phase change time between a current time and a pre-programmed phase change time at which the traffic signal is scheduled to switch from the second operating state to the first operating state; and
   transmit a second request to the ITM system controller to delay the switching of the second operating state to the first operating state in response to the expected incursion time being less than the estimated phase change time.

3. The wearable IEA system of claim 1, wherein the controller is further programmed to:
   receive, from the ITM system controller, a vehicle location of a motor vehicle in a traffic lane regulated by the traffic signal;
   determine whether the user location is within a predefined proximity to the vehicle location, wherein the controller transmits the request to the ITM system controller in response to the user location being within the predefined proximity to the vehicle location.

4. The wearable IEA system of claim 3, further comprising an alert system attached to the apparel body, wherein the controller is further programmed to command the alert system to generate a predefined visible, audible, and/or tactile alert perceptible by the user in response to the user location being within the predefined proximity to the vehicle location.

5. The wearable IEA system of claim 1, wherein the controller is further programmed to:
   receive, from the ITM system controller, a vehicle location of a motor vehicle in a traffic lane regulated by the traffic signal; and
   receive, from the ITM system controller, an indication of whether or not the vehicle location is within a predefined proximity to the traffic signal, wherein the controller transmits the request to the ITM system controller in response to the vehicle location being within the predefined proximity to the traffic signal.

6. The wearable IEA system of claim 5, further comprising an alert system attached to the apparel body, wherein the controller is further programmed to command the alert system to generate a predefined visible, audible, and/or tactile alert perceptible by the user in response to the vehicle location being within the predefined proximity to the traffic signal.

7. The wearable IEA system of claim 1, wherein the detection tag includes a radio frequency (RF) transponder, and wherein the prompt signal has a first RF power with a first frequency, and the response signal has a second RF power with a second frequency distinct from the first frequency.

8. The wearable IEA system of claim 7, wherein the prompt signal includes an embedded data set, and wherein the response signal retransmits at least a portion of the embedded data set back to the transmitter-detector module.

9. The wearable IEA system of claim 8, wherein the RF transponder includes an RF antenna and a frequency filter connected to the RF antenna, the frequency filter being configured to reject signals having RF powers with frequencies distinct from the first frequency.

10. The wearable IEA system of claim 1, wherein the controller is further programmed to:
    receive real-time user position data and user dynamics data of the user; and
    determine a pedestrian collision threat value based on fusion of the real-time user position data and the user dynamics data, the pedestrian collision threat value being predictive of intrusion of the user into a traffic lane regulated by the traffic signal, wherein the controller transmits the request to the ITM system controller based on the pedestrian collision threat value.

11. The wearable IEA system of claim 10, wherein the controller is further programmed to receive behavioral data indicative of historical behavior of the user, wherein the pedestrian collision threat value is further based on fusion of the user position data and the user dynamics data with the behavioral data.

12. The wearable IEA system of claim 11, wherein the controller is further programmed to receive crowd-sourced data indicative of behavior of multiple individuals in proximity to the user location, wherein the pedestrian collision threat value is further based on fusion of the behavioral data, the user position data, and the user dynamics data with the crowd-sourced data.

13. The wearable IEA system of claim 12, wherein the controller is further programmed to receive environmental data indicative of a surrounding environment of the user location, wherein the pedestrian collision threat value is further based on fusion of the behavioral data, the user position data, the user dynamics data, and the crowd-sourced data with the environmental data.

14. The wearable IEA system of claim 1, further comprising a haptic transducer attached to the apparel body, wherein the controller is further programmed to command the haptic transducer to generate a predefined tactile alert configured to warn the user of an impending collision with a motor vehicle in a traffic lane regulated by the traffic signal.

15. The wearable IEA system of claim 1, further comprising an audio component attached to the apparel body, wherein the controller is further programmed to command the audio component to generate a predefined audible alert configured to warn the user of an impending collision with a motor vehicle in a traffic lane regulated by the traffic signal.

16. The wearable IEA system of claim 1, further comprising a lighting device attached to the apparel body, wherein the controller is further programmed to command the lighting element to generate a predefined visible alert configured to warn the user of an impending collision with a motor vehicle in a traffic lane regulated by the traffic signal.

17. The wearable IEA system of claim 1, wherein the apparel body includes an article of clothing, headgear, eyewear, wrist wear, neck wear, and/or leg wear.

18. The wearable IEA system of claim 1, wherein the user has a portable electronic device, wherein the detection tag and the controller are mounted to the apparel body, and wherein the controller wirelessly connects to the portable electronic device of the user and thereby wirelessly communicates with the ITM system controller.

19. A wearable intelligent electronic apparel (IEA) system for communicating with an intelligent transportation management (ITM) system having a transmitter-detector module and an ITM system controller, the wearable IEA system comprising:
    an apparel body configured to be worn by a user;
    a detection tag attached to the apparel body, the detection tag being operable to receive a prompt signal from the transmitter-detector module and responsively transmit a response signal to the transmitter-detector module;
    a dynamics sensor attached to the apparel body and configured to detect a speed and/or a heading of the user and output sensor data indicative thereof; and
    a controller attached to the apparel body and communicatively connected to the detection tag and the dynamics sensor, the controller being programmed to:
    receive, from the ITM system controller, a user location of the user based on the response signal output by the detection tag to the transmitter-detector module;
    receive, from the ITM system controller, a first operating state of a traffic signal proximate the user location;
    determine, based on the sensor data received from the dynamics sensor, an expected incursion time that the user will breach a traffic lane regulated by the traffic signal; and
    receive, from the ITM system controller, an estimated phase change time between a current time and a preprogrammed phase change time at which the traffic signal is scheduled to switch from the first operating state to the second operating state; and
    transmit, to the ITM system controller in response to the expected incursion time being less than the estimated phase change, a request to switch the traffic signal from the first operating state to a second operating state.

20. A wearable intelligent electronic apparel (IEA) system for communicating with an intelligent transportation management (ITM) system having a transmitter-detector module and an ITM system controller, the wearable IEA system comprising:

an apparel body configured to be worn by a user;

a detection tag attached to the apparel body, the detection tag being operable to receive a prompt signal from the transmitter-detector module and responsively transmit a response signal to the transmitter-detector module;

a dynamics sensor attached to the apparel body and configured to detect a speed and/or a heading of the user and output sensor data indicative thereof; and a controller attached to the apparel body and communicatively connected to the detection tag and the dynamics sensor, the controller being programmed to:

receive, from the ITM system controller, a user location of the user based on the response signal output by the detection tag to the transmitter-detector module;

receive, from the ITM system controller, a first operating state of a traffic signal proximate the user location;

determine if the speed of the user is substantially equal to zero;

determine if the heading of the user is away from a traffic lane regulated by the traffic signal;

transmit, to the ITM system controller in response to the speed of the user being greater than zero and the heading of the user being towards the traffic lane regulated by the traffic signal, a request to switch the traffic signal from the first operating state to a second operating state; and not transmit the request to the ITM system controller in response to the speed of the user being substantially equal to zero and/or the heading of the user is away from the traffic lane regulated by the traffic signal.

* * * * *